(12) United States Patent
Na et al.

(10) Patent No.: US 7,872,202 B2
(45) Date of Patent: Jan. 18, 2011

(54) INPUTTING DEVICE

(75) Inventors: Gi-Lyong Na, Suwon-si (KR);
Wook-Hee Lee, Yongin-si (KR);
Young-Jin Jun, Suwon-si (KR);
Sung-Hwar Yim, Seoul (KR);
Min-Woong Choi, Seongnam-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 935 days.

(21) Appl. No.: 11/790,900

(22) Filed: Apr. 27, 2007

(65) Prior Publication Data
US 2007/0262954 A1 Nov. 15, 2007

(51) Int. Cl.
*H01H 9/00* (2006.01)

(52) U.S. Cl. .......................... 200/4; 200/1 R; 200/5 R; 200/6 R; 200/6 A; 335/205; 335/206; 335/207

(58) Field of Classification Search .................. 200/1 R, 200/4, 5 R, 6 R, 6 A; 400/472, 490, 492, 400/495; 341/20, 22, 32; 335/205, 206, 335/207
See application file for complete search history.

(56) References Cited

U.S. PATENT DOCUMENTS

| | | | | |
|---|---|---|---|---|
| 6,586,690 | B2 * | 7/2003 | Shimomura et al. | 200/6 A |
| 6,771,992 | B1 * | 8/2004 | Tomura et al. | 455/575.1 |
| 7,297,883 | B2 * | 11/2007 | Rochon et al. | 200/5 R |
| 7,462,787 | B1 * | 12/2008 | Kang et al. | 200/4 |
| 2004/0080491 | A1 | 4/2004 | Takatsuka et al. | |
| 2009/0078551 | A1 * | 3/2009 | Kang | 200/336 |

FOREIGN PATENT DOCUMENTS

| | | |
|---|---|---|
| JP | 8-22745 | 1/1996 |
| JP | 8-77882 | 3/1996 |
| JP | 2002-260489 | 9/2002 |
| JP | 2003-242862 | 8/2003 |
| JP | 2004-335383 | 11/2004 |
| JP | 2006-73311 | 3/2006 |
| WO | 02/086694 | 10/2002 |

OTHER PUBLICATIONS

Japanese Office Action and issued in corresponding Japanese Patent Application 2007-119337.
Office Action issued in corresponding Korean Patent Application No. 10-2006-0038138, on Jul. 30, 2007.

* cited by examiner

*Primary Examiner*—My-Chau T Tran

(57) ABSTRACT

An inputting device, used for electronic devices, for example, is disclosed. The inputting device in accordance with an embodiment of the present invention includes a case, which has a through-hole, a center key, which is exposed externally through the through-hole and is movable to any directions on a plane, an operating member, which is fixed to the case and supports the center key and returns the center key by elastic force to a center of the through-hole if the center key is moved from the center of the through-hole, a magnet, which moves with the center key on a plane, and a sensing element, which senses a movement of the magnet. With the input method of the present invention, not only is the operation easier, but also the entire thickness of a device can be reduced.

15 Claims, 5 Drawing Sheets

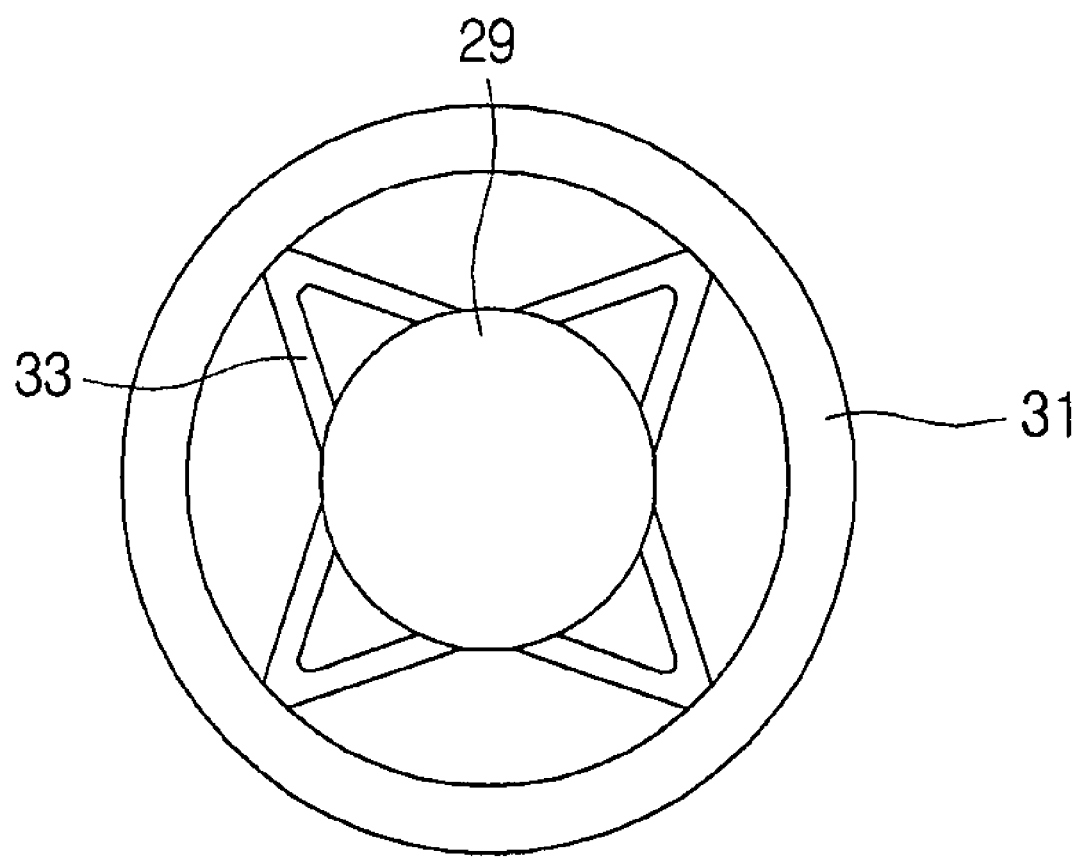

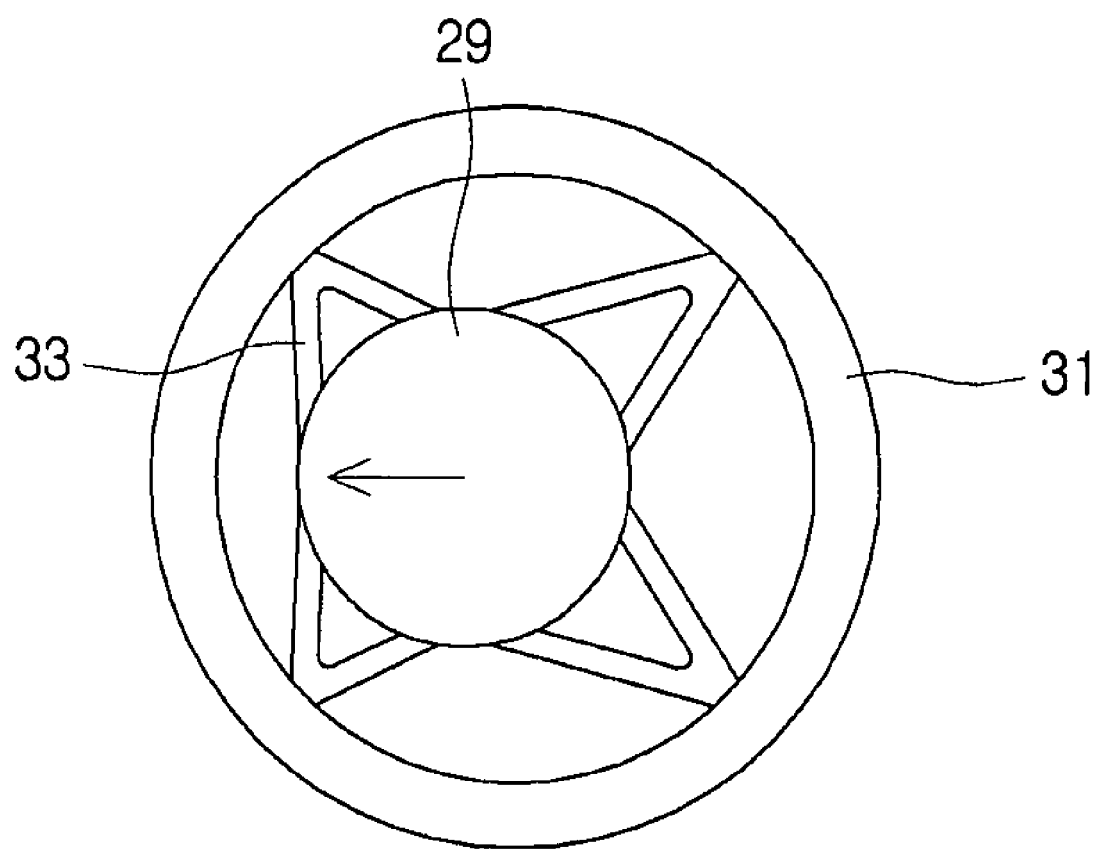

INPUTTING DEVICE

This application claims the benefit of Korean Application Number 10-2006-0038138, filed with the Korean Intellectual Property Office on Apr. 27, 2006, the disclosure of which are incorporated herein by reference.

BACKGROUND OF THE INVENTION

1. Field of the Invention

The present invention is directed to an inputting device.

2. Background Art

Many electronic devices, PDAs (personal digital assistants), for example, adopt an inputting device, called a pointing device. Users can use the inputting device to input desired information by moving a cursor or pointer on a display.

Portable terminals widely use an inputting device that can move an object desired to control, such as a cursor or pointer, in longitudinal and latitudinal directions. Such an inputting device recognizes the user's operation and converts the operation to a command to move the cursor or pointer in the longitudinal and latitudinal directions.

Today's mobile communication terminals are equipped with a wide variety of functions, for which the inputting device increasingly needs to move the cursor or pointer in the diagonal directions as well as the longitudinal and latitudinal directions. The conventional inputting devices, however, have not been able to move the pointer diagonally, hindering the efficient input of information.

Although an 8-directional inputting device has been developed to move the pointer or cursor to 45-degree angles as well as the longitudinal and latitudinal directions, there still have been limitations in unrestricted input of information. Although there also has been a device moving the cursor or pointer by use of a mouse or a track ball, not only was the operation inconvenient, but also the structure was complex, making the device unfit for portable terminals, which is increasingly becoming slimmer.

A joystick may be more convenient than the mouse or track ball, owing to its simpler operation of the lever, but it is also difficult to apply the joystick to a slim electronic device, such as a mobile phone.

SUMMARY OF THE INVENTION

The present invention provides an inputting device that is easy to input information and has simpler structure.

An aspect of the present invention features an inputting device. The inputting device includes a case, which has a through-hole, a center key, which is exposed externally through the through-hole and is movable to any directions on a plane, an operating member, which is fixed to the case and supports the center key and returns the center key by elastic force to a center of the through-hole if the center key is moved from the center of the through-hole, a magnet, which moves with the center key on a plane, and a sensing element, which senses a movement of the magnet.

The inputting device in accordance with embodiments of the present invention can have one or more of the following features. For example, the case can consist of a cover in which the through-hole is formed and a base to which the cover is coupled, and the cover can have a vertical gap from the base. The inputting device can also include a printed circuit board, which is fixed to the base and has at least one dome button positioned on one side, the dome button being pressed by the cover. The operating member can include a supporting unit and an operating unit. The supporting unit is fixed to the base and formed with a hole in a center, and the operating unit moves inside the hole and is coupled to the center key. The operating unit can be coupled to the supporting unit by a plurality of elastic arms. The arms can be split at a location of the supporting unit and can be coupled to an outer circle of the operating unit.

The operating unit can have a disc shape, and the arms can be split into pairs from the supporting unit and can be coupled to the outer circle of the operating unit along a tangent line. The arms can be separated at regular intervals on the supporting unit, and the operating unit can be supported by at least 3 arms. The operating unit, the supporting unit, and the arms can be formed into one body. The operating member can be made of elastic rubber.

A magnet inserting unit can be protruded on one side of the operating unit; the magnet can be inserted into the inside of the magnet inserting unit; and an outer circle of the magnet inserting unit can be inserted into the center key. A pressing protrusion, which is in contact with the dome button, can be protruded downward on a lower side of the operating member, and a side key corresponding to the location of the pressing protrusion can be formed on an upper side of the cover. A center dome button can be additionally disposed in the center of the printed circuit board, and the center dome button can be pressed by the center key.

The sensing element can be adhered to a lower side of the printed circuit board. The base can have an element inserting groove to which the sensing element is inserted. The base can have a plurality of fixing protrusions therein, and fixing holes, to which the fixing protrusions are inserted, can be formed on the operating member. The base can have a plurality of fixing protrusions, and fixing holes, to which the fixing protrusions are inserted, can be formed on the printed circuit board.

BRIEF DESCRIPTION OF THE DRAWINGS

These and other features, aspects and advantages of the present invention will become better understood with regard to the following description, appended claims and accompanying drawings where:

FIG. 4*a* is a sketch showing a center key located at the center of a through-hole in an inputting device in accordance with an embodiment of the present invention; and FIG. 4*b* is a sketch showing the center key off-centered in a through-hole in an inputting device in accordance with an embodiment of the present invention.

DESCRIPTION OF THE EMBODIMENTS

Figure 1:
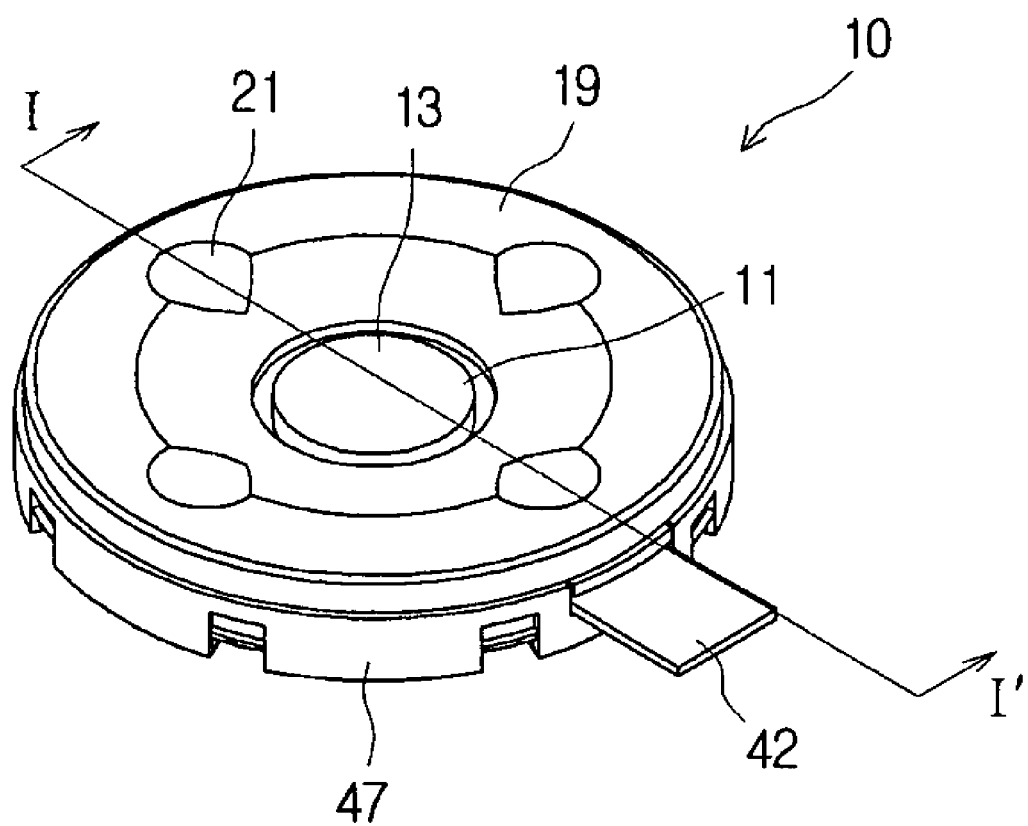
FIG. 1 shows a perspective view of an assembled inputting device in accordance with an embodiment of the present invention.

Hereinafter, certain embodiments of the present invention will be described with reference to the accompanying drawings. In the description with reference to the accompanying drawings, any identical or corresponding elements will be given the same reference numerals, and their pertinent description will not be repeated.

Referring to FIG. 1, an inputting device 10 in accordance with an embodiment of the present invention has a cylindrical case, consisting of a cover 19 and a base 47. In the center of the cylindrical case is a center key 11, which is moved in horizontal directions by a user. Here, the horizontal directions refer to a surface that is substantially parallel to the upper surface of the cover 19. Formed on the circumference of the cover are side keys 21. When the user presses the side key 21, a dome button (refer to 45 in FIG. 2) on the other side of the cover 19 is pressed to execute a predetermined function. Pressing the center key 11 can also press a dome button (refer to 43 in FIG. 2).

The inputting device 10 in accordance with the embodiment can be equipped on a mobile phone (not shown), and the pointer or cursor on an LCD (not shown) of the mobile phone can be moved to any directions in accordance with moving directions of the center key 11. Moreover, information can be inputted in various ways, as the inputting device can be operated by pressing the center key 11 or the side key 21.

Equipped inside the inputting device 10 is a printed circuit board (refer to 39 in FIG. 2), on which dome buttons, for example, are mounted. A lead line 42, which is connected to an external control device (not shown) to send and receive a signal, is protruded from the printed circuit board to the outside of the inputting device 10.

Figure 2:
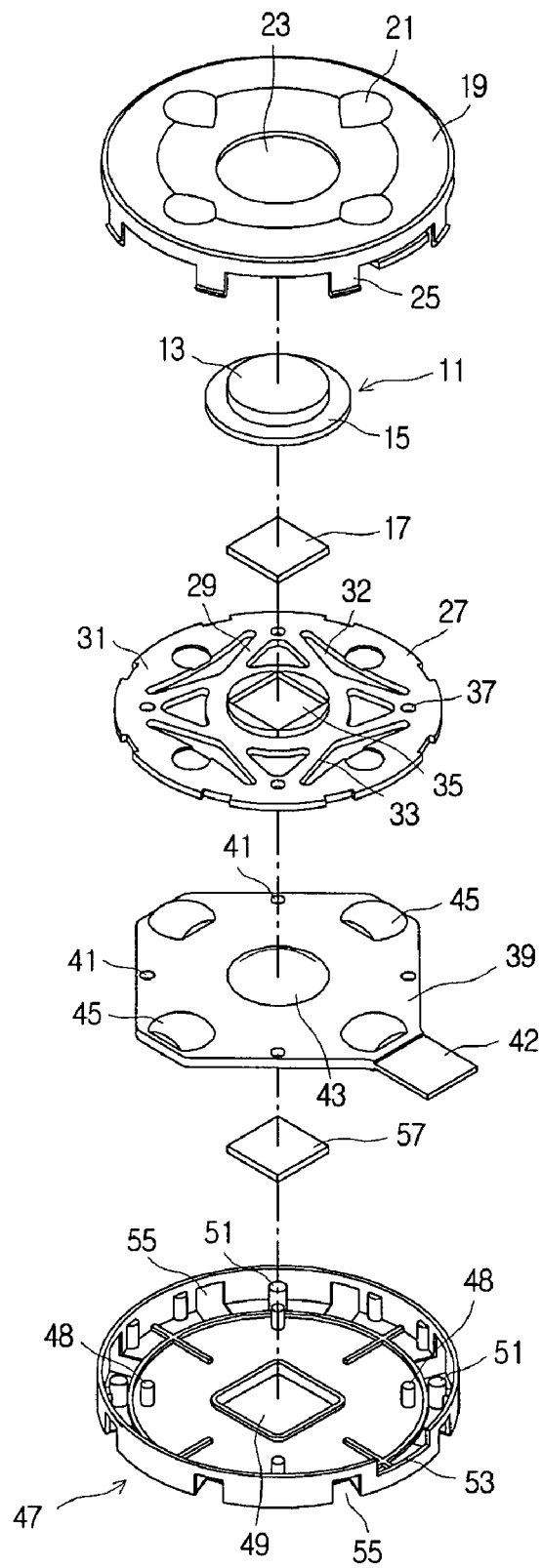
FIG. 2 shows a perspective view of a disassembled inputting device in accordance with an embodiment of the present invention.

Referring to FIG. 2, the inputting device 10 in accordance with an embodiment of the present invention has a sensing element 57, a printed circuit board 39, an operating member 27, a magnet 17, and a center key 11, in the order of placement, inside the cover 19 and the base 47, which form the case. In the inputting device 10 in accordance with the embodiment, the center key 11 is movable in any horizontal directions, and the movement of the magnet 17 is linked with the center key 11. The movement of the magnet 17 is sensed by the sensing element 57, which then generates a signal that moves the cursor or pointer. After the center key 11 is moved from the original position, the elastic force of the operating member 27 returns the center key 11 back to the original position.

The operating member 27 is made from elastic rubber into one body by a press process, and an operating unit 29, which is connected by and moves with the center key 11, is connected by an arm 33, allowing the operating unit 29 to return to the original shape by the elastic force after moving to any direction. Therefore, it is easy to operate the inputting device 10 in accordance with the embodiment because the center key 11 can be returned to the original position by the operating member 27 even though the center key 11 moves to a direction on a plane. Moreover, since the operating member 27 is formed as a single, thin body, it is not only easy to produce the inputting device but also possible to reduce the thickness of the inputting device.

The cover 19 is coupled to the base 47 to form the case of the inputting device 10. The cover is shaped like a donut, with a through-hole 23 in the middle, and side keys 21 are placed in regular intervals along the circumference of the through-hole 23. Protruded downward around the cover 19 are plural locking protrusions 25, which are inserted to cover locking grooves 55 of the base 47. Not only does the cover 19 protect internal parts, but also the user can press side dome buttons 45 by pressing the side keys 21 since it is possible to keep the cover 19 a certain distance away from the base 47.

Through the through-hole 23 formed in the center of the cover 19, a head unit 13 of the center key 11 is exposed to the outside. As the diameter of the through-hole 23 is larger than the diameter of the head unit 13, the head unit 13 can move to any horizontal direction inside the through-hole 23. The center key 11 is positioned in the center of the through-hole 23 (refer to FIG. 4*a*) when no external force is applied to the center key 11, and is returned to the center of the through-hole 23 by the elastic force of the operating member 27 if the external force is applied and then removed. As shown in FIG. 1, a body unit 15 of the center key 11 is exposed to the outside through the through-hole 23, which is always closed by the head unit 13 and the body unit 15 of the center key 11. A shock-absorbing material (not shown) can be inserted in between the through-hole 23 and the center key 11.

There are four side keys 21 arranged around the through-hole 23 with angular gaps of 90 degrees. As the side keys 21 correspond to the location of pressing protrusions (refer to 36 of FIG. 3) of the operating member 27, the pressing protrusions 36 get to press the side dome buttons 45 by the pressure of the side keys 21.

Figure 3:
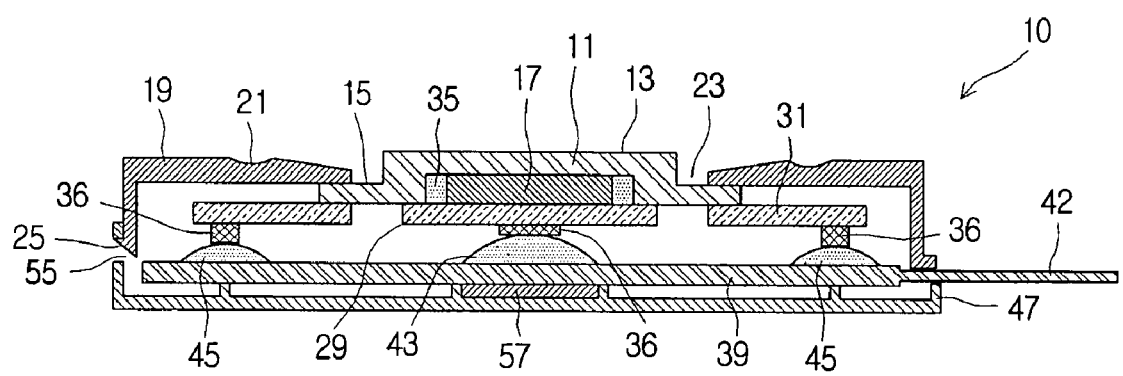
FIG. 3 is a cross-sectional view of the inputting device across the line I-I' of FIG. 1.

The locking protrusions 25, which are protruded downward at regular intervals along the circumference of the cover 19, are locked in the cover locking grooves 55 of the base 47 (refer to FIG. 3). As shown in FIG. 3, one end of the locking protrusions 25 is shaped like a hook to be locked in the cover locking grooves 55, making it possible for the cover 19 to keep a certain vertical distance.

The center key 11 includes the head unit 13, located in the through-hole 23 of the cover 19, and the body unit 15, formed on the lower surface of the head unit 13. The center key 11 is moved in horizontal directions by the operation of the user, and the movement of the magnet 17 is linked with the center key 11, enabling the input in accordance with the movement of the center key 11. Moreover, the center key 11 is pressed vertically by the user and moves downward to press the center dome button 43.

The head unit 13 is shaped like a cylinder, whose diameter is smaller than that of the through-hole 23, and is formed with a groove (not shown), to which a magnet inserting unit 35 is inserted. Therefore, the head unit 13 can move to any directions inside the through-hole 23, and the moving distance corresponds to the difference in diameter between the through-hole 23 and the head unit 13. The head unit 13 is located in the center of the through-hole 23 if no external force is applied (refer to FIG. 4*a*).

The body unit 15 is connected to the lower side of the head unit and is shaped like a disk. As shown in FIG. 3, the lower side of the body unit 15 is in contact with the upper side of the operating unit 29 of the operating member 27.

The magnet 17, located in the magnet inserting unit 35 of the operating member 27, moves in horizontal directions with the center key 11. The line of magnetic force generated by the magnet 17 is sensed by the sensing element 57, and a corresponding signal is generated. If the center key 11 is positioned in the center of the through-hole 23, as shown in FIG. 4*a*, in the inputting device 10 in accordance with the embodiment, the center of the magnet 17 and the centers of the head unit 13 and through-hole 23 coincide.

The operating member 27 is made by pressing, for example, elastic rubber and includes the operating unit 29, a supporting unit 31, and arms 33. The operating member 27 is fixed to the base 47 and coupled to the center key 11 to provide elastic force to the center key 11 that is moved from the original position such that the center key 11 is returned to the center of the through-hole 23. Not only can the operating member 27 be easily made by a press process, but also it can reduce the entire thickness of the inputting device 10 due to its thinness.

The supporting unit 31 is shaped like a disk, and the operating unit 29 and the arms 33 are formed in holes 32 in the center. Formed at 90-degree intervals near the circumference of the supporting unit 31 are fixing holes 37, each of which is inserted to a fixing protrusion 51 of the base 47 to fix the operating member 27 to the base 47. The pressing protrusions 36 are protruded downward to correspond to the location of the side dome buttons 45.

The operating unit 29 is shaped like a disc, whose center is protruded upward with the magnet inserting unit 35. The inside of the magnet inserting unit 35 is formed with a groove, to which the magnet 17 can be inserted. As the outer edge of the magnetic inserting unit 35 is fitted in the groove formed on the lower side of the center key 11, the center key 11 and the operating unit 29 are coupled and moved together. The outer edge of the operating unit 29 is attached with the arms 33.

A pair of arms 33 are split from the inner edge of the hole 32 of the supporting unit 31 and are attached to the outer edge of the operating unit 29 along the tangent line. Each arm 33 consists of a pair of elastic rods, which are split from the inner edge of the hole 32 and are attached to the outer edge of the supporting unit 31. There are at least three arms 33, which are arranged at regular intervals along the circumference of the operating unit 29. Since the arms 33 are made of elastic rubber, the supporting unit 31 is returned to the original position (the center of the through-hole 23) by the elastic force provided by the arms 33 if the supporting unit 31 is moved from the original position.

Since the arms 33 are structured in pairs, the movement of the operating unit 29 is not interfered by the contraction of the arms 33. Besides, the rolling of the operating unit 29 can be prevented. If the arms were structured with one rod only to support the operating unit 29, the supporting unit 31 would roll about the arms 33, which are arranged straight.

Mounted on the printed circuit board 39 are the center dome button 43 and the side dome buttons 45. The center dome button 43 is pressed by the center key 11, and the side dome buttons 45 are pressed by the pressing protrusions (refer to 36 in FIG. 3), formed on the other side of the operating member 27. The printed circuit board 39 is connected to an external control device, allowing information to be inputted by use of input signals generated by the sensing element 57 and the dome buttons 43 and 45. Attached on the lower side of the printed circuit board 39 is the sensing element 57, as shown in FIG. 3.

Formed on the printed circuit board 39 are fixing holes 41, to which board fixing protrusions 48 are inserted, for fixing the printed circuit board 39 to the base 47.

The sensing element 57 is attached and fixed to the lower side of the printed circuit board 39, and senses, with the center key 11, the movement of the magnet 17. Used for the sensing element is a hall IC or an MR (GMR) sensor, for example.

The hall IC generates electromotive force corresponding to the line of magnetic force generated by the magnet 17, and delivers the electromotive force to an external control device (not shown) through the printed circuit board 39. The MR sensor or GMR sensor changes its resistance according to the change in magnetic field, and uses the property that the resistance changes when the carrier path inside a solid becomes warped and lengthened by electromagnetic force. The MR sensor or GMR sensor is small, has a high signal level, is highly sensitive, and is operable in a low magnetic field, with excellent temperature stability.

The base 47 is coupled to the cover 19 to form the case. An element inserting hole 49 is formed in the center of the base 47. The sensing element 57 is inserted into and fixed to the element inserting hole 49. Formed inside the base 47 are the fixing protrusions 51, which are inserted into the fixing holes 37 of the operating member 27 to fix the operating member 27, and the fixing protrusions 48, which are inserted into the fixing holes 41 of the printed circuit board 39 to fix the printed circuit board 39. On one side of the base 47, a ledge 53, through which the lead line 42 of the printed circuit board 39 is extended, is formed. In addition, the cover locking groves 55, to which the locking protrusions 25 of the cover 19 are locked, are formed on the circumference of the base 47.

Hereinafter, the operation of the inputting device 10 in accordance with an embodiment of the present invention will be described with reference to FIGS. 3, 4a, and 4b.

Referring to FIG. 3, there is a fixed gap between the inner circle of the through-hole 23 of the cover 19 and the outer circle of the head unit 13 of the center key 11, enabling the center key 11 to move around the through-hole 23. As the body unit 15 of the center key 11 is always in contact with the lower side of the cover 19, the center key 11 can not be escaped when it moves. The center key 11 is also supported by the dome buttons 43 and 45 and the pressing protrusions 36, which are formed on the lower side of the operating member 27.

The magnet 17 is inserted between the operating unit 29 of the operating member 27 and the head unit 13 of the center key 11. Therefore, the center key 11, the magnet 17, and the operating unit 29 are moved together by the operation of the user. The operating unit 29 is supported by a plurality of arms 33 and is positioned in the center of the through-hole 23, as shown in FIG. 4a. If the user moves the center key 11 to any direction (to the left in the case of FIG. 4b), the arms 33 on the side to which the center key 11 is moved are contracted while the arms 33 on the side from which the center key 11 is moved are extended, providing elastic force to the operating unit 29. The arms 33 in accordance with the embodiment are coupled to the outer circle of the operating unit 29 along the tangent line, and thus the movement is not interfered by the operating unit 29 moving in any direction.

As the sensing element 57 recognizes the movement of the magnet 17, resulted from the movement of the operating unit 29, an input signal corresponding to the movement direction of the operating unit 29 is generated. When the user presses the center key 11, the pressing protrusion 36 on the other side of the operating unit 29 presses the center dome button 43, and the center key 11 gets returned to its original position by the elastic force of the dome button 43. Moreover, if the user presses one of the side keys 21, the cover 19 gets tilted, and the pressing protrusion 36 presses the side dome button 45 to perform the corresponding function. Then, the elastic force of the dome button 45 returns the side key 21 to the original position.

With the inputting device 10 in accordance with the embodiment described above, the center key 11 can move to any directions, and the center key 11 and the side keys 21 perform separate functions, making the input more convenient. Moreover, since the operating member 27 can be pressed into one body, the inputting device 10 can be made much thinner. As the inputting device 10 in accordance with the embodiment is coupled by the arms 33, which elastically support the operating unit 29, along the tangent line of the outer circle of the operating unit 29, the movement of the operating unit 29 is not interfered, making the operation much smoother.

Although certain embodiments of the present invention have been described, anyone of ordinary skill in the art to which the invention pertains should be able to understand that a very large number of permutations are possible without departing the spirit and scope of the present invention, which shall only be defined by the claims appended below.

What is claimed is:

1. An inputting device comprising:
a case, with a through-hole;

a center key, being exposed externally through the through-hole and being movable to any directions on a plane;

an operating member, being fixed to the case and supporting the center key, and returning the center key by elastic force to a center of the through-hole if the center key is moved from the center of the through-hole;

a magnet, moving with the center key on a plane; and a sensing element, sensing a movement of the magnet.

2. The inputting device of claim 1, further comprising a printed circuit board, being fixed to the base and having at least one dome button positioned on one side, the dome button being pressed by the cover, in which the case consists of a cover in which the through-hole is formed and a base to which the cover is coupled, and the cover can have a vertical gap from the base.

3. The inputting device of claim 2, in which the operating member comprises a supporting unit and an operating unit, the supporting unit being fixed to the base and formed with a hole in a center, the operating unit moving inside the hole and being coupled to the center key, and the operating unit is coupled to the supporting unit by a plurality of elastic arms.

4. The inputting device of claim 3, in which the arms are split at a location of the supporting unit and are coupled to an outer circle of the operating unit.

5. The inputting device of claim 3, in which the operating unit has a disc shape, and the arms are split into pairs from the supporting unit and are coupled to the outer circle of the operating unit along a tangent line.

6. The inputting device of claim 3, in which the arms are separated at regular intervals on the supporting unit, and the operating unit is supported by at least 3 arms.

7. The inputting device of claim 3, in which the operating unit, the supporting unit, and the arms are formed into one body.

8. The inputting device of claim 7, in which the operating member is made of elastic rubber.

9. The inputting device of claim 3, in which a magnet inserting unit is protruded on one side of the operating unit, the magnet is inserted into the inside of the magnet inserting unit, and an outer circle of the magnet inserting unit is inserted into the center key.

10. The inputting device of claim 2, in which a pressing protrusion being in contact with the dome button is protruded downward on a lower side of the operating member, and a side key corresponding to the location of the pressing protrusion is formed on an upper side of the cover.

11. The inputting device of claim 2, in which a center dome button is additionally disposed in the center of the printed circuit board, and the center dome button is pressed by the center key.

12. The inputting device of claim 2, in which the sensing element is adhered to a lower side of the printed circuit board.

13. The inputting device of claim 12, in which the base has an element inserting groove to which the sensing element is inserted.

14. The inputting device of claim 2, in which the base has a plurality of fixing protrusions therein, and fixing holes, to which the fixing protrusions are inserted, are formed on the operating member.

15. The inputting device of claim 2, in which the base has a plurality of fixing protrusions, and fixing holes, to which the fixing protrusions are inserted, are formed on the printed circuit board.

* * * * *

UNITED STATES PATENT AND TRADEMARK OFFICE
CERTIFICATE OF CORRECTION

PATENT NO. : 7,872,202 B2
APPLICATION NO. : 11/790900
DATED : January 18, 2011
INVENTOR(S) : Gi-Lyong Na et al.

Page 1 of 1

It is certified that error appears in the above-identified patent and that said Letters Patent is hereby corrected as shown below:

ON THE TITLE PAGE:

Column 1, please insert the following:

Item --(30)    Foreign Application Priority Data

April 27, 2006    (KR)................................10-2006-0038138--.

Item (56) References Cited, Column 2 (Other Publications), Line 1, after "Action" insert --received on June 29, 2009--.

Signed and Sealed this
Twenty-seventh Day of March, 2012

David J. Kappos
*Director of the United States Patent and Trademark Office*